Nov. 18, 1969  K. BIRKEN  3,478,589

DIELECTRIC VARIABLE CAPACITOR

Filed Oct. 11, 1965

INVENTOR
KARL BIRKEN
BY

ATTORNEY.

United States Patent Office

3,478,589
Patented Nov. 18, 1969

---

3,478,589
DIELECTRIC VARIABLE CAPACITOR
Karl Birken, New York, N.Y., assignor to RC-95 Incorporated, New York, N.Y., a corporation of New York
Filed Oct. 11, 1965, Ser. No. 494,719
Int. Cl. G01k 5/18, 5/52, 5/72
U.S. Cl. 73—362                14 Claims

ABSTRACT OF THE DISCLOSURE

A capacitor having a dielectric which is a fluid and whose dielectric constant may be varied by variation of the density of the fluid, as by pressure or temperature means. The capacitor with the dielectric fluid is contained in an appropriate enclosure permitting energy flow to and from the dielectric fluid thereby providing variable capacitor operation.

---

Figure 1:
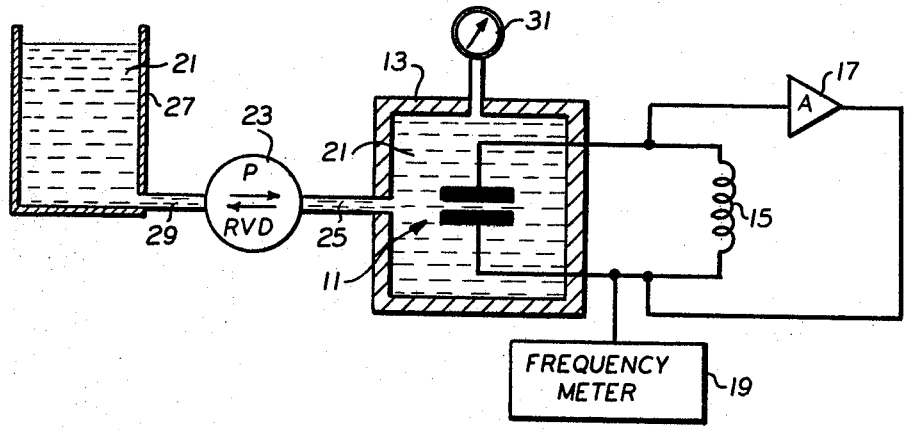

The present invention relates to capacitors and involves variation and control of the operating characteristics thereof, particularly by variation of the density of a fluid dielectric.

Control of capacitor characteristics is a desideratum that applies in universal fashion to practically all aspects of electrical devices and functions. Due to the basic nature of the capacitor as an element in electrical circuits, wide ranging significance attaches to the value and importance of means for augmenting the usefulness and adaptability of capacitors. The present invention is aimed toward provision of a novel capacitor structure and arrangement whose operating characteristics, particularly capacitance, can be simply and effectively controlled or varied in a manner adaptable to a large number of applications and uses.

Briefly stated, the present invention involves the utilization of a fluid dielectric in a capacitor and the variation of the density of the dielectric, as for example by pressure or temperature variation, thereby providing a variation in the dielectric constant of the dielectric and in the electrical operating characteristics of the capacitor.

An experimental structural embodiment of the invention comprises a fluid container with a capacitor mounted therein. A fluid dielectric fills the container and means are provided for varying the density of the dielectric, the specific density-varying means envisioned lying within a very wide range of appropriate devices includes pressure and temperature variation.

The capacitor may be electrically connected to circuit elements adapted to sense the state of the capacitor and be appropriately affected thereby, in order to provide an electrical response to changes in the density of the dielectric.

Specifically, these elements may comprise an inductance placed in series with the capacitor and an amplifier connected in parallel to form a tank circuit. A metering device, such as a frequency meter may be connected to sense variations in the capacitor. Any change in the density of the fluid dielectric, as by changes in pressure, will result in a change in the dielectric constant thereof and in the capacitance of the capacitor which can be read as a change in the frequency of the current flowing thru the capacitor circuit.

It will be appreciated that the invention may have utility in a very large number of applications. Circuits requiring variable capacitance capacitors are a possibility, as well as devices where it is desired to obtain an electrical indication of the nature or state of a fluid. Probably a more important application would be in the area of pressure or temperature transducers, with pressure or temperature variation being readable as a change in frequency after appropriate calibration of the apparatus involved. In this connection, one very important aspect of the present invention is the high degree of sensitivity and accuracy afforded thereby, particularly in connection with pressure measuring transducers, temperature measuring devices, or other similar apparatus.

For example, pressure measuring transducers presently known usually involve some mechanical components which are prone to limit the accuracy of the device due to the introduction of error. The present invention provides the advantage that it eliminates error in such pressure measuring devices which may occur as the result of mechanical components. With the present invention, the pressure of a fluid, such as the dielectric fluid of a capacitor, may be directly translated into an electrical phenomenon which may be readily utilized or measured. Furthermore, the present invention has the additional advantage over pressure gauges presently known that it substantially extends the maximum levels of pressure which can be measured. In this regard, the maximum pressure which can be measured is limited only by the pressure which the materials used, e.g. the fluid container, can withstand and not by any inherent operational aspect of the mechanism involved.

Accordingly, it is an object of the present invention to provide a novel capacitor structure and arrangement.

Another object of the invention is to provide a capacitor whose operating characteristics, particularly capacitance, are variable or controllable.

A further object of the invention is to provide a capacitive transducer mechanism.

A still further object of the invention is to provide means for directly and selectively controlling the characteristics of a capacitor during operation thereof.

Still another object of the invention is to provide a capacitor device sensitive to the condition of a fluid dielectric adaptable to give an electrical indication of the nature or state of the fluid and any changes which might occur.

Another object of the invention is to provide a measuring device having improved sensitivity and accuracy.

Another object of the present invention is to provide an improved transducer element having improved sensitivity and accuracy.

Figure 2:
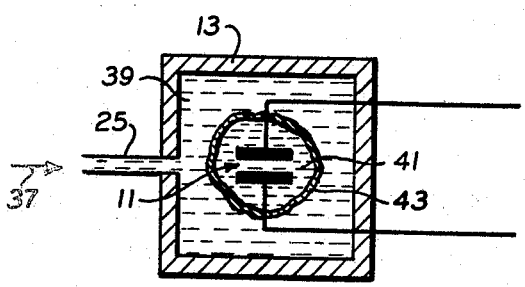
Figure 3:
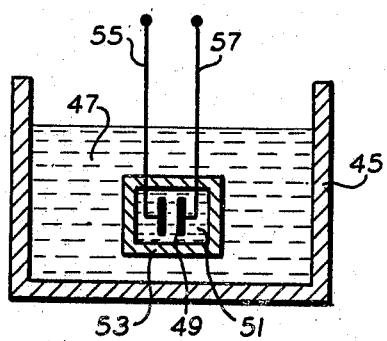
Figure 3:

A better understanding, as well as other objects and advantages of the invention, may be obtained from the following detailed description, taken in connection with the accompanying drawing wherein:

FIG. 1 is a schematic diagram of an arrangement exemplifying the basic principle of the invention and will be referred to in describing certain applications thereof; and FIGS. 2, and 3 are schematic diagrams showing additional application of the capacitor of FIG. 1.

Referring to FIG. 1, there is shown a capacitor 11 mounted within a hermetically sealed container 13 and connected in series with an inductance 15 positioned exteriorly of the container 13. An appropriate power source such as an amplifier 17 is connected in parallel as shown, and a frequency meter 19 is connected to sense the frequency of the current flowing through capacitor 11.

The container 13 is filled with a dielectric fluid 21 which surrounds the plates of capacitor 11, and extends between the plates thereof to form an appropriate capacitor dielectric layer.

The pressure of dielectric fluid 21 may be varied by a reversible variable delivery pump 23 which is connected to container 13 by a suitable conduit 25. A source of dielectric fluid 21 contained in a supply container 27 feeds pump 23 through a conduit 29, and a pressure gauge 31 is mounted on container 13 to enable reading of the dielectric fluid pressure. Although the means for varying the pressure within container 13 are shown as comprising pump 23, gauge 31 and container 27, it is to be understood that other appropriate means, which can be easily provided by those skilled in the art and which are adequate to perform the desired functions, are contemplated as within the purview of the invention.

In operation, it was found that variation of the fluid pressure within tank 13 causes a variation in the frequency, as measured by meter 19, of the current passing through the capacitor 11. Of course, in varying the fluid pressure to achieve the frequency change, all other factors in the system were maintained relatively constant to insure that the frequency change reflects, or is the result of, as much as possible, the change in the fluid pressure within container 13.

Furthermore, it was found that at particular levels of fluid pressure within the container 13, a corresponding particular rate of frequency will be present through capacitor 11. That is, whether pressure is increasing or decreasing to reach a given specific reading on gauge 31, each time that a particular reading is present on gauge 31, the same corresponding reading will result on the frequency meter 19.

Thus, it is possible to predict what the frequency of current passing through capacitor 11 will be for a particular level of pressure in the container 13, since each time that particular pressure level is created in container 13, a unique corresponding frequency rate through capacitor 11 will result.

The significance of the pressure gauge 31 in the embodiment of FIG. 1 is primarily related to this aspect of the invention, since as will be apparent from the foregoing, the apparatus of the present invention can be calibrated to produce a predictable electrical output, e.g. frequency, for a particular pressure input. In performing such a calibration, the pressure gauge 31 is, of course, important to give the required pressure reading.

From the foregoing, it will be clear that the principles embodied in the arrangement of FIG. 1 are susceptible to a large number of applications. One such application is in the field of pressure transducers.

A particularly important aspect of the present invention is that it provides a very high degree of sensitivity and accuracy between input and output. This characteristic applies with equal significance whether the input mechanism achieves variation of the density of the dielectric by pressure or temperature variation, or by other means.

This characteristic of high sensitivity and accuracy is of particular import when the present invention is utilized as a pressure transducer. This application of the invention is regarded as a most important one since it makes possible pressure measurement with a very high degree of accuracy and sensitivity, eliminating much of the error present in pressure measurement devices which include mechanical and frictional error producing elements.

A schematic indication of one manner in which the apparatus of FIG. 1 may be adapted to utilization as a pressure measuring transducer is shown in FIG. 2. The conduit 25, instead of being fed by pump 23, is adapted to receive a pressure input indicated by arrow 37 from a source whose pressure is to be measured. In the event that the fluid whose pressure comprises the input to the transducer may be utilized as the dielectric for capacitor 11, the transducer may be arranged according to the construction shown in FIG. 1. If, however, the fluid whose pressure is to be measured is not compatible with use as a capacitor dielectric, then some means, such as a diaphragm, bellows, a similar device must be provided to physically separate the fluids while permitting pressure transfer therebetween.

A preferred means for accomplishing such separation is shown in FIG. 2. The fluid whose pressure is to be measured is indicated by numeral 39 while the dielectric for capacitor 11 is indicated by numeral 41. A thin flexible membrane 43 capable of separating fluids 39 and 41 surrounds capacitor 11. The membrane 43 totally encloses the dielectric 41 and permits pressure in the fluid 39 to be transmitted to the dielectric 41 to effect a change in the capacitance of capacitor 11 as described in connection with FIG. 1. The membrane 43 has the advantage that it minimizes any error which might be introduced by utilization of other separating devices such as bellows, or diaphragms.

Of course, if the arrangement of FIG. 2 has been properly calibrated in the manner previously described, a metering device such as the frequency meter 19 can be attached to the circuit of capacitor 11 and thereby provide a very accurate indication of the input pressure to conduit 25.

In addition to the foregoing, the present invention is potentially usable in many applications requiring a variable capacitor where it is desired to selectively control the capacitance thereof. Such control could be effected by utilization of dielectric fluid density varying means, such as pump 23 and container 11, which would enable selective variation of the pressure within container 13 in accordance with the capacitance desired for capacitor 11. Of course, this capacitance, and the degree of its variability would depend upon the particular application involved, but it will be clear that the circuit including inductor 15 and capacitor 11 could readily be appropriately connected into additional apparatus to provide this type of control.

Another application of the present invention is as a transducer element, in addition to the pressure measurement device already described, where it is desired to provide electrical power to one system from a second system actuated by thermal or mechanical power, such as, for example, hydraulic or pneumatic power. Of course, such an application could include use of the present invention as a computer element wherein a mechanical input, such as, for example, a fluid pressure analogue, would be converted into an electrical output. In such devices, it will be clear that merely by replacing pump 23 and container 27 by other appropriate devices providing a pressure input into conduit 25, and by appropriately connecting capacitor 11 in circuitry other than that shown, the present invention can be adapted to function in a wide variety of applications.

As previously pointed out, capacitor 11 will exhibit a unique capacitance for a particular level of pressure of the fluid dielectric 21, and therefore, the apparatus of the present invention can be calibrated to produce a predictable electrical output, e.g. frequency, for a particular pressure input. This characteristic adapts the present invention for a wide range of uses relating to measuring and safety devices in addition to those already described. For example, if it were desired to measure the amount of fluid in tank 27, this could be accomplished, in a system excluding pump 23 where conduit 25 directly interconnects containers 13 and 27, by calibrating the frequency meter 19 to give readings indicative of the fluid level in tank 27. Assuming that the level in tank 27 was subject to variation, increasing or decreasing the amount of fluid in tank 27 would increase or decrease, respectively, the pressure of the fluid dielectric 21, this change being reflected in a change in the frequency reading on meter 19. If, in such systems the fluid whose level is to be measured cannot be used as the dielectric for capacitor 11, i.e., if its electrical properties are not appropriate for such use, a diaphragm, a bellows, a membrane 43, or any similar device capable of separating fluids while transmitting pressure, could be included within conduit 25, in a manner similar to that described in connection with FIG. 2.

An additional significant embodiment of the present invention is shown in FIG. 3. This arrangement relates to the temperature sensitive aspects of the present invention and involves a vat or container 45 having therein a fluid 47 whose temperature is to be measured. A capacitor 49 surrounded by a dielectric fluid 51 is mounted within a container 53, which may comprise any appropriate heat transmitting material which will permit the temperature of the fluid 47 to affect the density of the dielectric 51. The capacitor 49 can be connected in circuit with any appropriate additional equipment through leads 55, 57, for example, in a manner similar to that shown in FIG. 1. In this fashion, an electrical indication, such as a frequency reading on meter 19, can be obtained which will enable measurement of the temperature of fluid 47. Once again it should be noted that a significant advantage of such a device will be the sensitivity and accuracy with which measurements can be taken.

It should be understood that there will occur to those skilled in the art many ways of varying the density of the dielectric fluid utilized herein, and that it is not intended or attempted to disclose or describe all such ways. Nevertheless, it is intended to hereby cover all such ways as are within the scope and spirit of the present invention.

Furthermore, it should be understood that the foregoing disclosure relates to only preferred embodiments of the invention and that it is intended to cover all changes and modifications of the examples of the invention herein chosen for the purposes of the disclosure.

What is claimed and desired to be protected by Letters Patent of the United States is:

1. A capacitor device comprising a capacitor with a pair of plates, container means, a dielectric fluid hermetically enclosed within said container means and extending between said plates, said fluid providing a dielectric layer for said capacitor between said plates, means for controllably nonincidentally varying the density of said dielectric fluid thereby to vary the dielectric constant thereof, said container means being adapted to cooperate with said density varying means by permitting energy transfer between said density varying means and said dielectric fluid to controllably nonincidentally alter the density of said dielectric fluid thereby to effect said variation of said dielectric constant, so as to vary the capacitance of the device independently of the plate spacing, a current source connected to said capacitor, and means placed in circuit with said capacitor responsive to current flow therethrough effective to provide an indication of the action of said density varying means.

2. A capacitor device according to claim 1 wherein said density varying means comprises means for varying the pressure of said fluid dielectric.

3. A capacitor device according to claim 2 wherein said means placed in circuit with said capacitor comprises a meter providing a reading of the frequency of current through said capacitor, and wherein for any singular level of pressure of said dielectric fluid, a corresponding singular frequency reading will invariably appear upon said meter.

4. A capacitor device according to claim 1 wherein said density varying means comprises means for varying the temperature of said fluid dielectric.

5. A capacitor device according to claim 1 wherein said current responsive indicating means is calibrated correlating the state of said density varying means with said indication thereof.

6. A capacitor device according to claim 5 wherein said current responsive indicating means comprises a frequency meter.

7. A capacitor device according to claim 1 wherein said container means comprises flexible material separating said density varying means and said dielectric fluid while permitting energy transfer therebetween.

8. A capacitor device according to claim 1 wherein for any singular state of said density varying means a corresponding singular indication will be provided by said means placed in circuit with said capacitor.

9. A transducer comprising a capacitor having a pair of plates, container means within which said plates are mounted, a dielectric fluid within said container means extending between said plates providing the dielectric layer for said capacitor, input means comprising an energy source cooperating with said container means to controllably nonincidentally vary the density of said dielectric fluid thereby to vary the dielectric constant thereof, a current source connected to said capacitor, and output means connected in circuit with said capacitor and responsive to current flow therethrough converting the input from said energy source into a corresponding electrical energy output.

10. A variable capacitor comprising electrode means, a fluid comprising the dielectric for said capacitor, and means including container means therefor for controllably nonincidentally varying the density of said dielectric fluid thereby to vary the dielectric constant thereof.

11. A pressure measuring device comprising a capacitor having a pair of plates, container means within which said plates are mounted, a dielectric fluid within said container means extending between said plates providing the dielectric layer for said capacitor, a second fluid located externally of said container means and physically separated from said dielectric fluid, means cooperating with said container means for transmitting pressure between said dielectric fluid and said second fluid to controllably nonincidentally vary the density of said dielectric fluid thereby to vary the dielectric constant thereof, a current source connected to said capacitor, and means in circuit with said capacitor responsive to current flow therethrough providing an indication of the pressure of said second fluid.

12. A capacitor device comprising a capacitor having a pair of plates, a container comprising flexible material completely surrounding said plates and including means permitting electrical connection to said plates from externally of said container, a dielectric fluid hermetically enclosed within said container extending between said plates providing the dielectric layer for said capacitor, pressure means located externally of said container acting upon said flexible material to controllably nonincidentally vary the density of said dielectric fluid in order to vary the dielectric constant thereof, a current source connected to said capacitor, and means in circuit with said capacitor responsive to current flow therethrough providing an indication of the action of said pressure means.

13. A temperature measuring device comprising a capacitor having a pair of plates, container means of heat conductive material, a dielectric fluid hermetically enclosed within said container means extending between said plates providing the dielectric layer for said capacitor, means cooperating with said container means for transferring heat to and away from said dielectric fluid to controllably nonincidentally vary the density of said dielectric fluid thereby to vary the dielectric constant thereof, a current source connected to said capacitor, and means in circuit with said capacitor responsive to current flow therethrough providing an indication of the temperature to by measured.

14. A capacitor device comprising a capacitor having a pair of plates mounted within a container, a fluid dielectric enclosed within said container and extending between said plates to provide the dielectric layer for said capacitor between said plates, input means cooperating with said container adapted to controllably nonincidentally vary the density of said dielectric fluid thereby to vary the dielectric constant thereof in accordance with the value of said input provided by said input means, a current source connected to said capacitor, and ouput means correlated to said input means and connected in circuit with said capacitor responsive to current flow therethrough providing in correspondence with said input value an indication of the state of said input means.

(References on following page)

References Cited

UNITED STATES PATENTS

| | | | |
|---|---|---|---|
| 2,011,710 | 8/1935 | Davis | 317—244 XR |
| 2,087,003 | 7/1937 | Miller | 331—181 XR |
| 2,042,957 | 6/1936 | Osnos | 317—255 |
| 2,617,299 | 11/1952 | Ennis et al. | 324—61 X |
| 2,714,703 | 8/1955 | Ruderfer. | |
| 2,725,548 | 11/1955 | Harris. | |
| 3,067,385 | 12/1962 | Rykoskey | 324—61 |
| 3,068,700 | 12/1962 | Bourns. | |
| 3,225,595 | 12/1965 | Dotto | 73—301 |
| 3,257,607 | 6/1966 | Pintell | 317—247 X |

LOUIS R. PRINCE, Primary Examiner

FREDERICK SHOON, Assistant Examiner

U.S. Cl. X.R.

73—398; 317—245, 247, 255; 324—61